United States Patent [19]
Sekine et al.

[11] Patent Number: 5,666,158
[45] Date of Patent: Sep. 9, 1997

[54] IMAGE PICK-UP APPARATUS HAVING VIBRATION CORRECTING CIRCUITRY

[75] Inventors: Masayoshi Sekine, Tokyo; Jun Tokumitsu, Sagamihara; Toshiaki Kondo, Atsugi; Koji Takahashi, Yokohama; Isao Harigaya, Yokohama; Naoki Kawamata, Yokohama, all of Japan

[73] Assignee: Canon Kabushiki Kaisha, Tokyo, Japan

[21] Appl. No.: 462,539

[22] Filed: Jun. 5, 1995

Related U.S. Application Data

[63] Continuation of Ser. No. 84,329, Jun. 30, 1993, abandoned, Continuation of Ser. No. 691,784, Apr. 26, 1991, abandoned.

[30] Foreign Application Priority Data

Apr. 29, 1990 [JP] Japan ..................... 2-112661
Apr. 29, 1990 [JP] Japan ..................... 2-112662

[51] Int. Cl.$^6$ ..................... H04N 3/16; H04N 5/257
[52] U.S. Cl. ..................... 348/209; 348/224; 348/369
[58] Field of Search ..................... 348/207, 208, 348/213, 224, 369; 354/450, 430; H04N 5/232

[56] References Cited

U.S. PATENT DOCUMENTS

| | | | |
|---|---|---|---|
| 3,518,372 | 6/1970 | Johns | 358/222 |
| 4,612,575 | 9/1986 | Ishman et al. | 348/208 |
| 4,623,930 | 11/1986 | Oshima et al. | 348/208 |
| 4,713,697 | 12/1987 | Gotou et al. | 358/222 |
| 4,780,739 | 10/1988 | Kawakami et al. | 354/430 |
| 5,020,890 | 6/1991 | Oshima et al. | 350/500 |
| 5,170,255 | 12/1992 | Yamada et al. | 348/208 |
| 5,172,226 | 12/1992 | Morimura et al. | 358/105 |
| 5,198,896 | 3/1993 | Kondo et al. | 358/105 |

FOREIGN PATENT DOCUMENTS

| | | | |
|---|---|---|---|
| 3630385 | 3/1987 | Germany | G02B 7/00 |
| 61-288664 | 12/1986 | Japan | H04N 5/232 |
| 2063376 | 3/1990 | Japan | H04N 5/232 |

OTHER PUBLICATIONS

"Servo Type Camera Anti-Vibrartion Equipment", Takuji Sekiguchi, *NHK Laboratories Note* (Nov. 1987).

*Primary Examiner*—Leo Boudreau
*Assistant Examiner*—Bipin Shalwala
*Attorney, Agent, or Firm*—Fitzpatrick, Cella, Harper & Scinto

[57] ABSTRACT

An image pick-up apparatus includes a detection circuit for detecting vibration of the apparatus body, a correction system for correcting the vibration by shifting an image, and a control circuit for controlling driving of the correction system in accordance with an output of the detection circuit. A closed loop frequency characteristic is constituted as a notch filter, and a blocking frequency of the notch filter is made variable on the basis of changes in the detected vibration frequency.

19 Claims, 10 Drawing Sheets

IMAGE PICK-UP APPARATUS HAVING VIBRATION CORRECTING CIRCUITRY

This application is a continuation of application Ser. No. 08/084,329, filed Jun. 30, 1993, which is a continuation of Ser. No. 07/691,784, filed Apr. 26, 1991, both now abandoned.

BACKGROUND OF THE INVENTION

1. Field of the Invention

The present invention relates to an image pick-up apparatus having the vibration-proof and object tracking features useful for a TV camera, an electronic still camera, industrial image instrumentation equipment.

2. Related Background Art

Recently, image instruments such as TV cameras, electronic still cameras, or industrial image instrumentation equipment as mentioned above have been developed in which multiple functions and high performance are sought, and a great problem with this type of an image instrument is the deflection of the camera. As the deflection of a camera yields many problems in that it may not only degrade the quality of the image, but also decrease greatly the resolution, further causing a malfunction of the control system of an automatic focusing adjustment device, the correction of the camera deflection is noted as a quite important feature in photographing an image.

As the correction method for the camera deflection, there are various methods such as a method of detecting physically the vibration of the camera by means of an external sensor such as an angular velocity sensor, or a method of correcting the optical system by detecting the movement of the image corresponding to the deflection of the camera from an image signal, in which it is thought that the latter will be widely used in the future, because it can detect a photographing state from the image signal without the need of any special sensors.

Exemplary of an optical pick-up apparatus for detecting the deflection of camera from an image signal and correcting optically the deflection based on that signal is that shown in Japanese Laid-Open Patent Application No. 61-269572 entitled "Optical pick-up apparatus".

Figure 2:
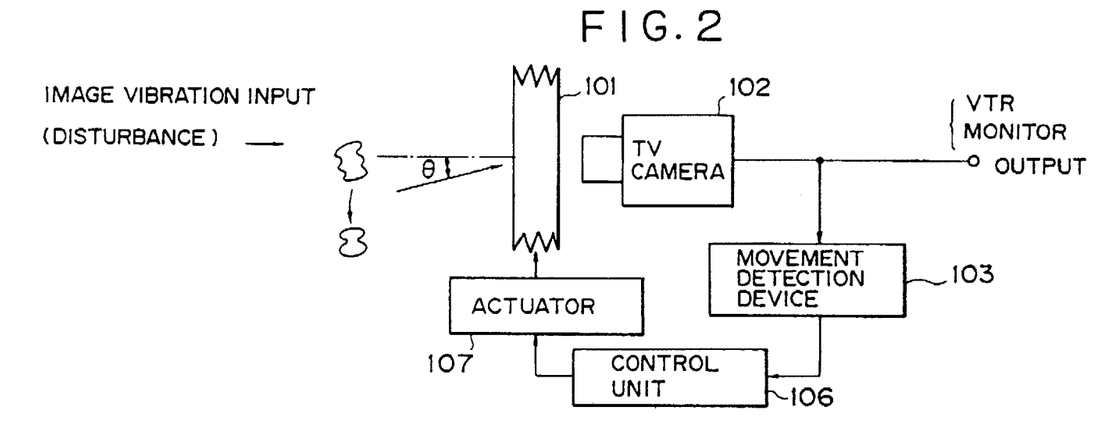
FIG. 2 is a block diagram showing a conventional configuration.

A configuration example for this apparatus is schematically shown in FIG. 2.

In the same figure, 101 is a variable apex angle prism, and 102 is a TV camera, which is image input means freely movable with respect to the camera body shown in "Optical pick-up apparatus" as previously described. 103 is a movement detection device, 106 is a controller, and 107 is an actuator (e.g., motor, voice coil, etc.).

This optical pick-up apparatus has an incident angle θ of an object varying with the vibration of the apparatus body. Thereby, the object image within a screen may be varied because the TV camera 102 captures an object image as the field.

A movement detection device outputs a difference between object positions on an immediately previous screen and the current screen, in which this difference signal is operated with predetermined control information via a control unit 106 so as to allow the actuator 107 to drive the variable apex angle prism 101 in a direction of compensating for the movement of the image, so that the monitor output has a stable image almost without vibration.

Exemplary of the method of detecting the vibration with a sensor is that shown in "Image deflection prevention technique for video camera" (National Technical Report Vol. 34, No. 6 December 1988). This shows that a lens-barrel freely rotates in a gimbal mount on a camera body, and the relative angle with respect to the camera body is controlled by detecting the angular velocity of the lens-barrel by means of two small gyros mounted on the lens-barrel. Therefore, the lens-barrel is always kept in a fixed direction, thereby providing a stable image without deflection.

However, in the above-mentioned conventional apparatuses, the following problems may arise on the control system.

Figure 3:
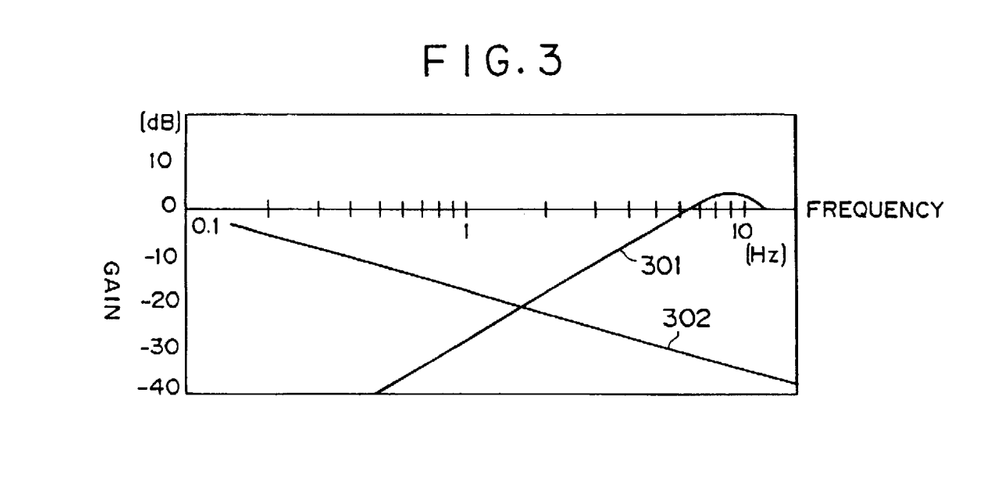
FIG. 3 is a view showing the frequency characteristics in the conventional apparatus.

The first problem will be described. Estimating the frequency characteristic of a vibration suppression ratio indicating how the output image should be stabilized for the deflection of camera has presented the frequency characteristics as shown in FIG. 3.

The conventional example as previously described has the characteristic rising upward to the right as indicated by 301 in the figure, while the latter case has the characteristic lowering downward to the right as indicated by 302, as easily understood from the previous document.

In general, as the vibration of a camera owing to trembling of hand or walking contains many frequency components caused by the breathing or walking of the operator, it is necessary for the correction of deflection to suppress the amplitude at that frequency. But, in the conventional examples, the vibration suppression ratio at the frequency of interest is smaller than those at other frequencies, and thereby has a poorer efficiency.

The second problem is that in general, as a sensor or movement detection apparatus has some detection errors or non-linearity, the conventional examples have an integral element for stabilizing the system or a circuit with a large time constant in the feedback circuit, and integrate the detection errors as well, thereby sometimes yielding drift (a phenomenon in which the output fluctuates even if the input is not varied).

The third problem is that when there occurs a step-like vibration, and subsequently no vibration, the optical image deflection correction means (variable apex angle prism and lens-barrel) is left away from a neutral position, and power continues to be consumed.

The fourth problem is that as optical image deflection correction means is limited in the correction angle, if the limit value is reached during the vibration-proof operation, the image that has been stabilized before may be deflected suddenly, thereby yielding an unclear image.

The fifth problem is that the amplitude and frequency of camera deflection are varied depending on the cause of the deflection (for example, there are vibrations due to breathing or walking of the camera operator, or vibrations of a vehicle such as a car).

And if seeking to obtain vibration-proof effects for all of them, an inconsistent problem arises in that the loop gain must be increased, thereby making the system unstable (an over-shoot increases and a resonance frequency occurs).

The sixth problem is that as the sensor or movement detection device has some detection errors or nonlinearity, an inconsistent problem also arises in that if the vibration-proof effects are sought in a low frequency band, the time constant of the circuit becomes large and errors are integrated, thereby causing drift.

The seventh problem is that when there occurs a step-like vibration, and subsequently no vibration, the optical image deflection correction means (variable apex angle prism and lens-barrel) is left away from a neutral position, and power continues to be consumed.

The eighth problem is that as optical image deflection correction means is limited in the correction angle, if the limit value is reached during the vibration-proof operation, the image that has been stabilized before is deflected suddenly, thereby yielding an unclear image.

SUMMARY OF THE INVENTION

The present invention has been made to solve the above-mentioned problems, and it is a first object to provide a pick-up apparatus with a vibration-proof feature capable of achieving excelelnt vibration isolation at all times, irrespective of the caused state of vibration.

A second object of the present invention is to provide a pick-up apparatus capable of performing a stable pick-up operation, wherein the vibration correction can be effected so that the suppression operation may largely act on the frequency of vibration due to the deflection of the camera.

A third object of the present invention is to provide a pick-up apparatus capable of implementing a natural and stable vibration-proof apparatus, wherein an abrupt deflection of the screen in the critical correction angle can be relieved without drift and with little power consumption, due to the ability of effectively attenuating the vibration of frequencies with large amplitudes, with the provision of at least one or more stages of a BPF in the feedback loop of a vibration-proof control system such as a vibraiton-proof TV camera.

In order to achieve these objects, according to a preferred example of the present invention, an image pick-up apparatus is disclosed which comprises detection means for detecting the vibration of the apparatus body, correction means for correcting said vibration by shifting an image, and control means for controlling the driving of the correction means in accordance with the output of the detection means, wherein the closed loop frequency characteristics are provided by a notch filter type.

Also, in order to accomplish the above objects, according to a preferred example of the present invention, an image pick-up apparatus is disclosed which comprises a closed loop control system composed of detection means for detecting the vibration of the pick-up apparatus, correction means for correcting the vibration by shifting an image, and control means for controlling the driving of the correction means in accordance with the output of the detection means, wherein the control means sets the frequency characteristics in the closed loop control system so that the control amount for the correction means is varied depending on the frequency of the vibration.

A fourth object of the present invention is to provide a pick-up apparatus capable of effecting adaptively, vibration isolation for deflections due to different causes by making variable the blocking frequency of a notch filter for determining the closed loop frequency characteristics of a vibration-proof control system in fulfilling the vibration isolation of the pick-up apparatus.

A fifth object of the present invention is to provide a pick-up apparatus capable of attenuating the vibration of a camera effectively and stably, irrespective of the service condition of camera, by changing the frequency characteristic of the control system in accordance with a selected pick-up mode, and matching the blocking frequency of the closed loop to a dominant frequency of image deflection.

A sixth object of the present invention is to provide a pick-up apparatus capable of providing a stable and non-deflectable image by being able to attenuate only the frequency with large amplitude of camera deflection in accordance with a pick-up situation, because the closed loop frequency characteristics for the feedback loop in a vibration-proof control system for a vibration-proof TV camera or the like is provided by a notch filter, with its blocking frequency being freely changed.

A seventh object of the present invention is to provide a pick-up apparatus capable of implementing a natural and stable vibration-proof apparatus because it is possible to improve the characteristics such as the drift of the control system, consumption of power, or abrupt screen deflection in the critical correction angle.

In order to accomplish these objects, according to a preferred example of the present invention, an image pick-up apparatus is disclosed which comprises a control system composed of detection means for detecting the vibration of an apparatus body, correction means for correcting the vibration by shifting an image, and control means for controlling the driving of the correction means in accordance with the output of the detection means, wherein the closed loop frequency characteristics are provided by a notch filter, and the blocking frequency of the notch filter is made variable.

In order to accomplish these above objects, according to a preferred example of the present invention, an image pick-up apparatus is disclosed which comprises a control system composed of detection means for detecting the vibration of an apparatus body, correction means for correcting the vibraiton by shifting an image, and control means for controlling the driving of the correction means in accordance with the output of said detection means, wherein the closed loop frequency characteristics are provided by a band-pass filter, and the pass frequency of said band-pass filter is made variable.

According to a preferred example of the present invention, an image pick-up apparatus is disclosed which comprises a control system composed of detection means for detecting the vibration of apparatus body, correction means for correcting the vibration by shifting an image, and control means for controlling the driving of the correction means in accordance with the output of the detection means, wherein the closed loop frequency characteristics are provided by a notch filter, and the blocking frequency of the notch filter is made variable in accordance with the output of the detection means.

Additional objects and feature of the present invention will become apparent from the following description and the accompanying drawings.

DETAILED DESCRIPTION OF THE PREFERRED EMBODIMENTS

An image pick-up apparatus according to the present invention will be described in the following with reference to the drawings.

Figure 1:
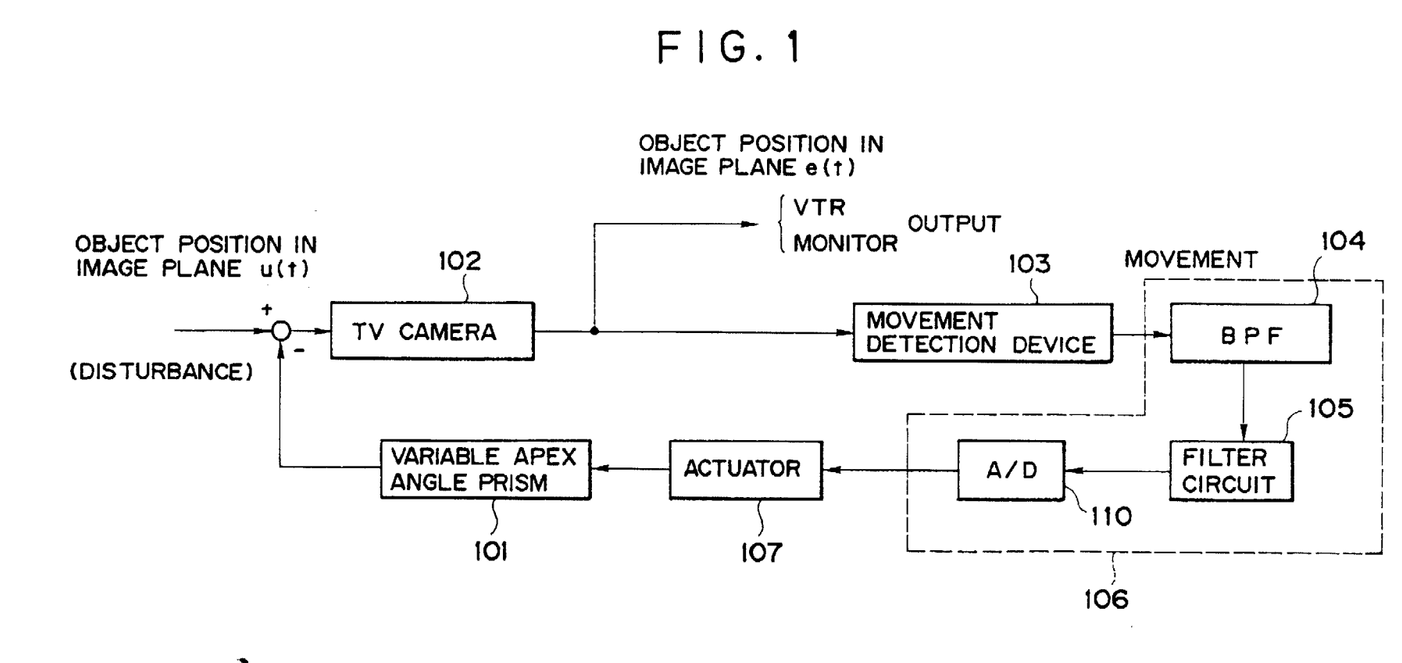
FIG. 1 is a block diagram showing a first example of a pick-up apparatus according to the present invention.

FIG. 1 is a block diagram showing a configuration where a pick-up apparatus of the present invention is applied to a vibration-proof camera.

In the same figure, 101 is a variable apex angle prism, for example, one made by filling a silicone liquid between two sheets of parallel glass plates and sealing its peripheral portion, in which the inclination of the optic axis is controlled by changing the angle between the parallel glass plates, thereby correcting the movement of image due to a deflection of the camera.

102 is a TV camera, 103 is a movement detection device for detecting the movement of the image, 106 is a control unit for controlling generally an apparatus of the present invention, and 107 is an actuator for driving the variable apex angle prism 101.

Here, the control unit 106 is divided into a band-pass filter 104 and the other filter portion 105.

Next, the operation of this apparatus will be described using the concept of control theory.

First, for considering the response of a digital system, the system transfer function is used.

Assuming the transfer function of this apparatus to be G(z) that is a z transformation of a sample value, G(z) can be expressed as, $$G(z)=E(z)/U(z)$$

where U(z) is a z transformation of a sample value for an input signal u(t), and E(z) is a z transformation of a sample value for an output signal e(t).

In this apparatus, with the TV camera 102, the information for the angle of the camera is input discretely to give an object position in the image plane u(t), and an object position in the image plane e(t) in a monitor and VTR can be obtained as the output. This apparatus is a regulator system in which e(t) is kept zero even if there is any input of u(t).

The sampling frequency is considered to be within a range from 30 Hz to 60 Hz in the NTSC standards.

Here, the feature of this apparatus is that the transfer function G(z) has a frequency characteristic of a notch filter. And to implement this characteristic, this apparatus has BPF 104 provided in the control unit 106.

The relation between a pass frequency value for BPF104 and the transfer function G(z) of this apparatus will be described with reference to FIG. 4.

Figure 4:
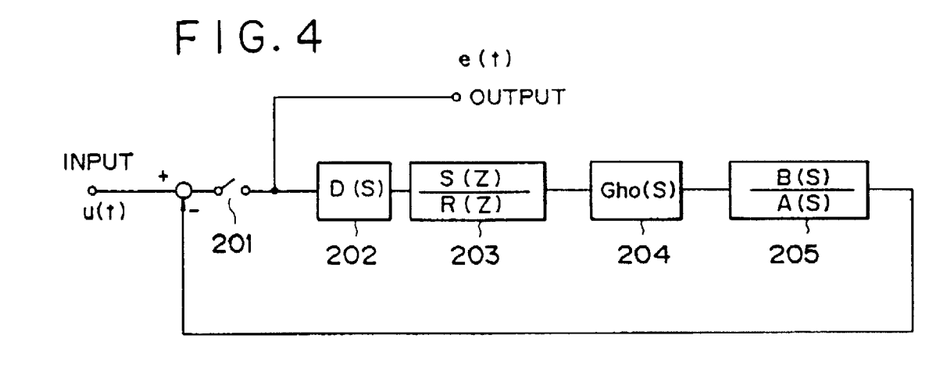
FIG. 4 is a block diagram representing a control system of the first example with the transfer functions.

FIG. 4 is a view of further modeling the block diagram of FIG. 1, with each transfer function indicated in each block.

201 is a sampler, meaning the TV camera 102. 202 is the movement detection device 103. 203 is an operation unit of the control unit 106. 204 is a zeroth hold (A/D converter 110), and 205 corresponds to the variable apex angle prism 101 and the actuator 107.

Here, a denominator R(z) of block 203 is divided into two parts such as, $$R(z)=R_1(z) \cdot R_2(z)$$

Here, $1/R_1(z)$ is the transfer function of BPF 104, and $S(z)/R_2(z)$ is that of filter circuit 105.

Integrating the sampler 201 and the holder 202, and the block 204 into one block such as, $$B'(z)/A'(z)=D(z) \cdot Z[Gho(s) \cdot B(s)/A(s)]$$

the transfer function H(z) of the whole vibration-proof camera is $$G(z)=(R_1(z)R_2(z)A'(z))/(R_1(z)R_2(z)A'(z)+S(z)B'(z))$$

The transfer function of BPF 104 $1/R_1(z)$ is represented as, $$1/R_1(z)=1/(1-2\gamma \cos(\omega c T)z^{-1}+\gamma^2 z^{-2})$$

or can be derived from an analog filter with a bilinear transformation.

Note that $\gamma$ is a coefficient ($\gamma<1$), $\omega c$ is a central angular frequency, and T is a sampling interval.

After the designing of BPF 104, the pole of the denominator of G(z) is allocated. Thereby the system is stabilized, and the inverse characteristic of BPF 104 (i.e., notch filter) can be obtained under the influence of numerator $R_1(z)$.

Here, let the central frequency be $f_C$, the cut-off frequency on high-pass side be $f_H$ and the cut-off frequency on low-pass side be $f_L$ for BPF104. Generally, taking into consideration that the vibration frequency due to the trembling of a hand on the camera is concentrated on a range from 0.1 to 3 Hz, it is desirable that $f_C=0.5-2.0$ Hz $f_H=3.0$ Hz or more $f_L=0.5$ Hz or less That is, $f_H$ is set to make the zero cross frequency as high as possible, $f_C$ is set to resolve the first problem of the present invention, and $f_L$ is set to resolve the second, third and fourth problems.

Figure 5:
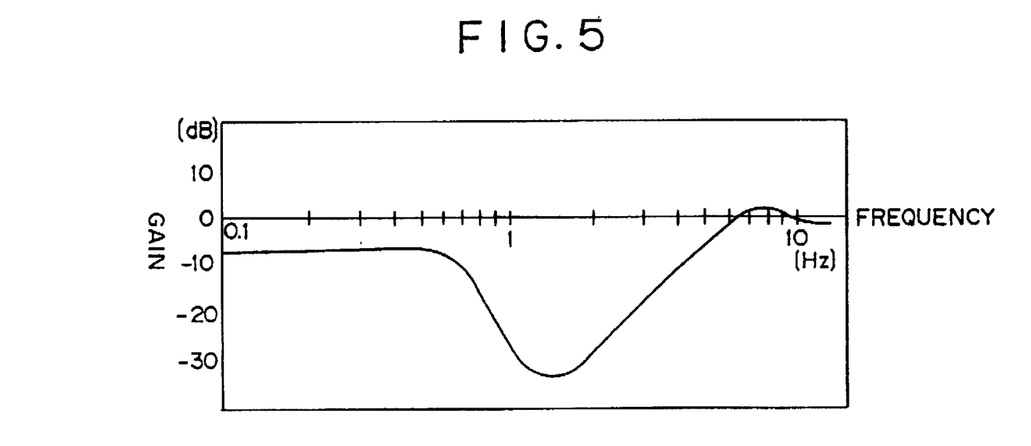
FIG. 5 is a view showing the frequency characteristic of the control system as shown in FIG. 4.

The vibration-proof suppression ratio of a vibration-proof TV camera designed with the above method is shown in FIG. 5.

As clearly seen from the same figure, the maximum suppression ratio is given on a frequency band from 0.5 to 2.0 Hz where most vibration such as trembling of the hand occurs.

Figure 6:
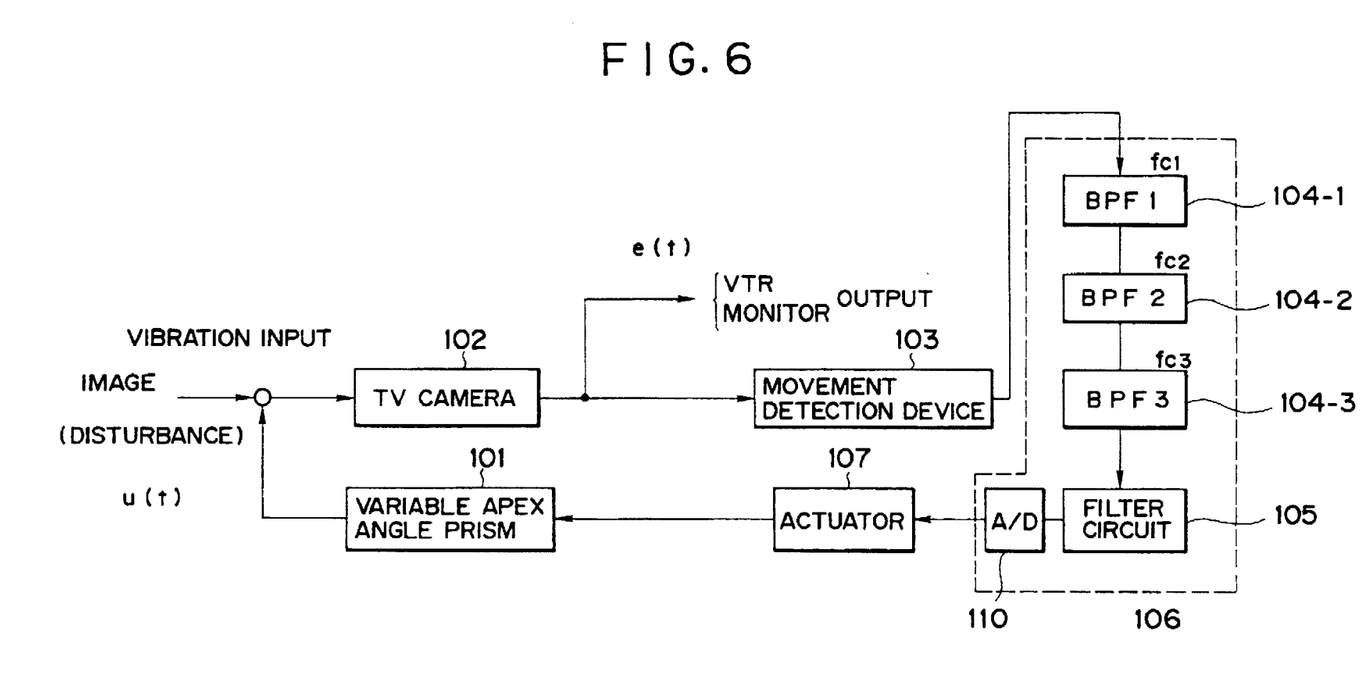
FIG. 6 is a block diagram showing a second example of a pick-up apparatus according to the present invention.

FIG. 6 shows a block diagram of a vibration-proof TV camera according to the second example of the present invention. A constitutional difference from the block diagram of FIG. 1 is that there are a plurality of BPFs such as BPF104-1, 104-2 and 104-3, rather than BPF 104, but other structure and functions of the block are the same. Here, let the central frequencies of BPF 104-1, 104-2 and 104-3 be $f_{C1}$, $f_{C2}$ and $f_{C3}$, respectively.

An object of an apparatus according to this example resides in obtaining a higher vibration suppression ratio than the constitution of FIG. 1, and a wider frequency band or a plurality of frequency bands.

Figure 7A:
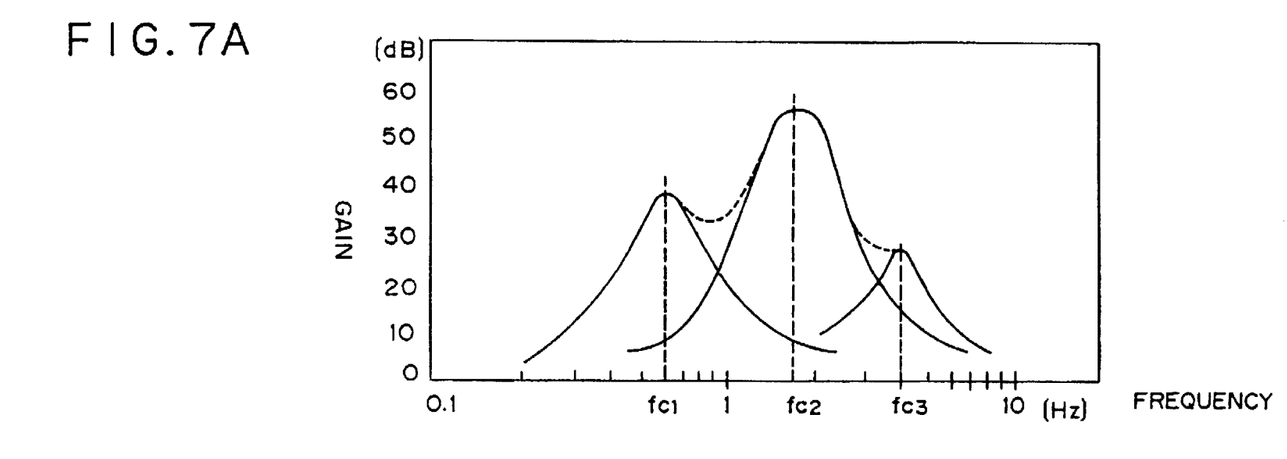
FIGS. 7A and 7B are views showing the frequency characteristics for a control system of the second example as shown in FIG. 6.

In order to show the actions and effects, FIG. 7A shows the frequency characteristic of each BPF.

Figure 7B:
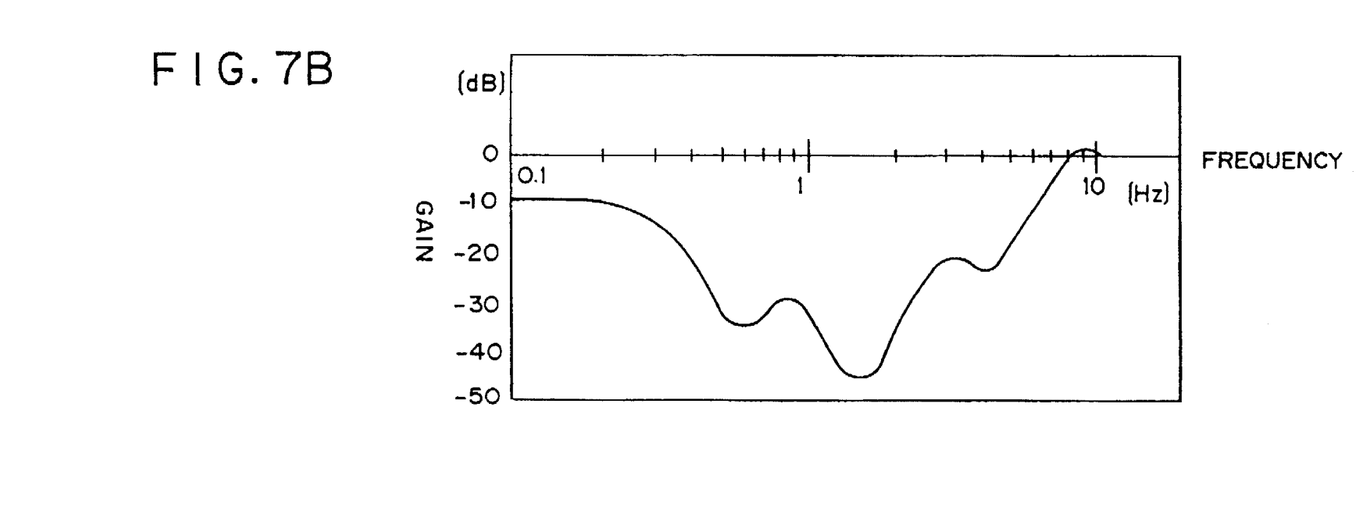

In the same figure, the central frequencies $f_{C1}$, $f_{C2}$ and $f_{C3}$ of BPF 104-1, 104-2 and 104-3 are different from each other, and the purpose of each frequency is that $f_{C1}$: prevents the vibration due to breathing of the operator, 0.5–1.0 Hz $f_{C2}$: prevents the vibration due to walking 1.0–3.0 Hz $f_{C3}$: prevents the vibration generated by the operation of button, 4.0 Hz FIG. 7B shows the vibration suppression ratio of a vibration-proof TV camera. It can be shown that in the frequencies corresponding to $f_{C1}$, $f_{C2}$ and $f_{C3}$, the vibration is effectively suppressed.

Next, a third example of the present invention will be described.

This example is one in which the present invention is applied to a camera vibration-proof apparatus as described in "Image deflection prevention technique of video camera" as discussed in the description of the conventional technique.

Figure 8:
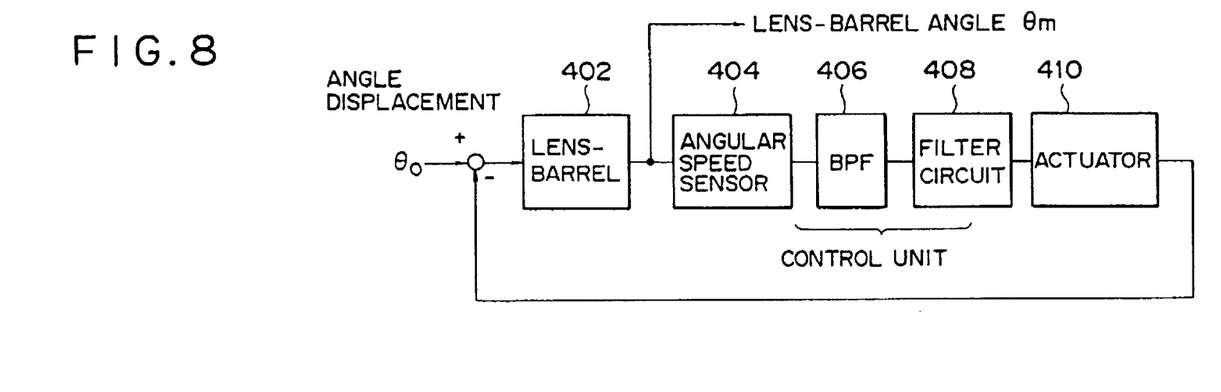
FIG. 8 is a block diagram showing a third example of a pick-up apparatus according to the present invention.

FIG. 8 shows a block diagram of the apparatus according to this example. In the figure, 402 is a lens-barrel, 404 is an angular speed sensor such as a vibration gyro, 406 is BPF, 408 is a filter circuit, and 410 is an actuator. Here, the control unit 406 is constructed of the BPF 406 and the filter circuit 408.

And a different point from the conventional one is that the control unit is provided with the BPF 406.

Next, the operation and actions of this example will be described. As the angular speed sensor 404 detects a differential value θ n for the lens-barrel angle θ n, an integrator is used for the feedback.

In this case, accumulation of detection errors for the sensor yields a characteristic such as drift, as previously described. However, if the feedback gain is taken to be low, a problem arises that the vibration suppression ratio can not be sufficiently obtained.

Thus, with the BPF 406, by feeding back only the frequency at which there are many vibrations with high gain, high vibration-proof effects can be efficiently obtained.

This example differs from the first example in that it is not a discrete control system, but a continuous control system, and the lens-barrel 302 has a large inertia giving itself the vibration suppression effect.

Figure 9:
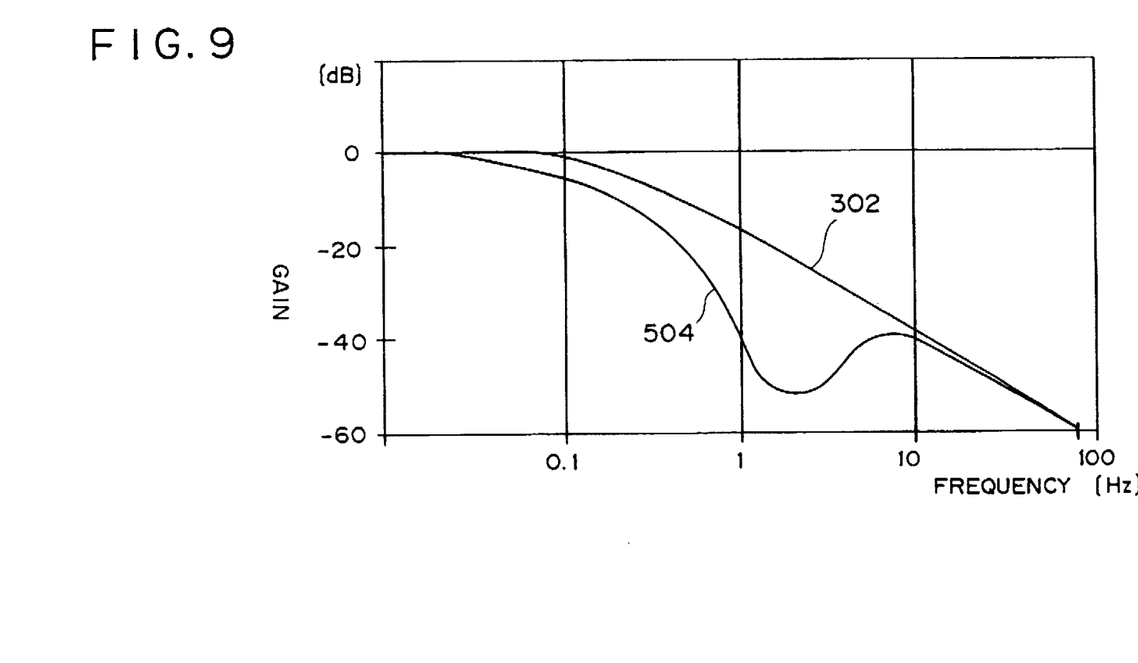
FIG. 9 is a view showing the frequency characteristic for a control system of the third example as shown in FIG. 8.

FIG. 9 shows the vibration suppression ratio of a vibration-proof pick-up apparatus according to the present invention. The frequency characteristic obtained in this apparatus is in a form of curve 504, in which the characteristic is greatly improved compared with the vibration-proof characteristic curve 302 as described in the document as previously cited.

As above described, the pick-up apparatus according to the present invention has the effect of attenuating the vibration frequency with large amplitude effectively, with the provision of at least one stage or more BPF in the feedback loop of a vibration-proof control system such as a vibration-proof TV camera.

Also, it is possible to implement a natural and stable vibration-proof apparatus because abrupt deflection of the screen at the critical correction angle can be relieved without drift and with little power consumption.

Next, a fourth example of the present invention will be described. This example is suitable to accomplish the fourth to seventh objects as previously described, in which the blocking frequency of the notch filter in the closed-loop is made variable.

Figure 10:
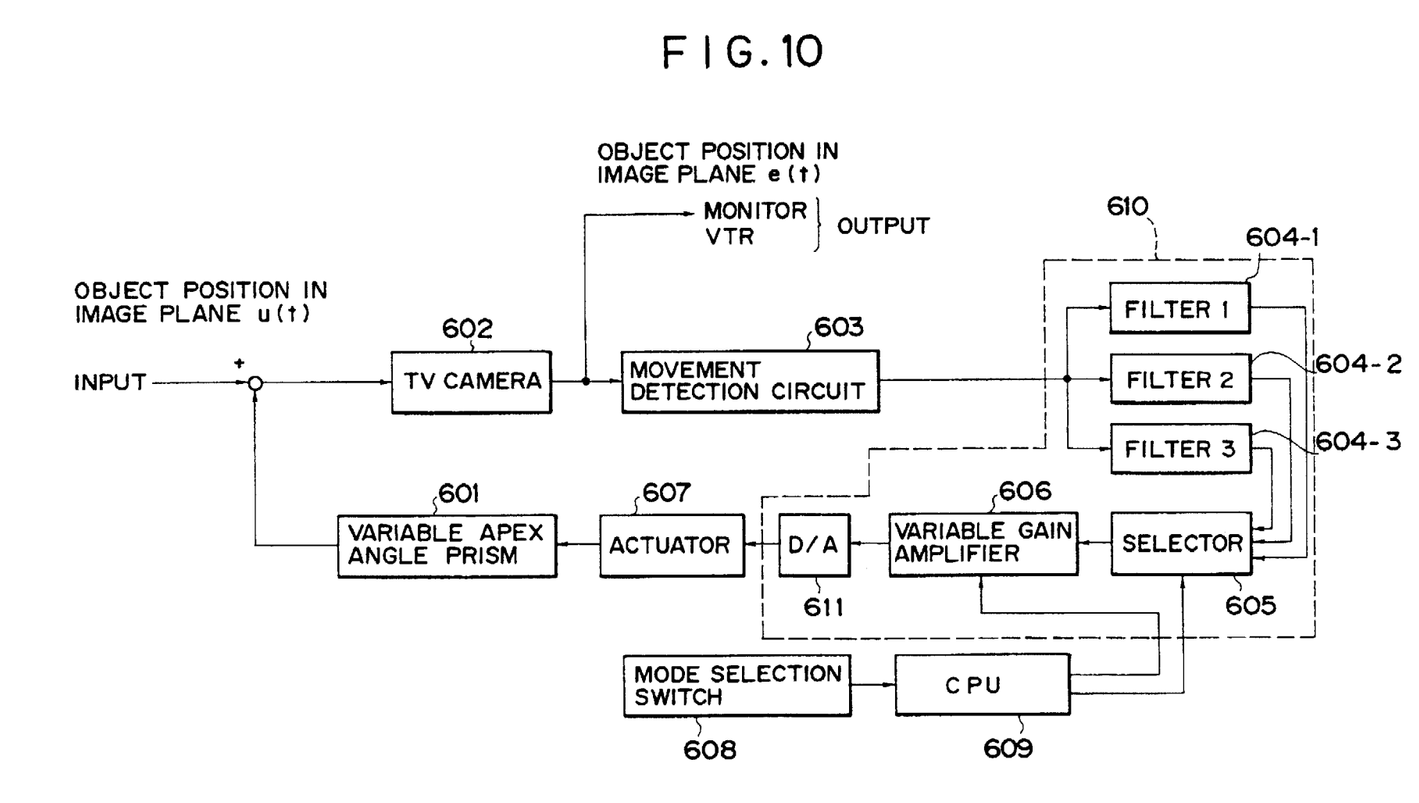
FIG. 10 is a block diagram showing a fourth example of a pick-up apparatus according to the present invention.

FIG. 10 is a block diagram showing a configuration where a pick-up apparatus of the present invention is applied to a vibration-proof camera.

In the same figure, 601 is a variable apex angle 10 prism as also used in the previous exmaple, 602 is a TV camera, 603 is a movement detection device for detecting the movement of image, 604-1–604-3 are filter circuits, 605 is a selector for selecting the filter circuits, 606 is a variable gain amplifier, 607 is an actuator for driving the variable apex angle prism, 608 is a mode selection switch, 609 is a CPU of a microcomputer as a control circuit for controlling this system globally, and 611 is a D/A converter.

Next, the operation of the present invention will be described using the same figure.

Here, the apparatus of the present invention is a feedback control system, in which the response ability of system can be changed with the frequency characteristic of the control unit 610.

Thus, this apparatus is provided with at least two types of filter circuits 604, which are adaptively switched with the selector 605.

The variable gain amplifier 606 has its gain adjusted so that the system is stabilized for a selected filter circuit. The mode is selected with the mode selection switch 608, and the CPU 609 generates preprogrammed values to drive the selector 605 and the varriable gain amplifier 606.

In this way, in accordance with the amount of movement of the detected image, the variable apex angle prism 101 is driven by the actuator 107 through the controller with a different frequency characteristic gain for each mode so as to accomplish the feedback function. Thereby, the monitor output e(t) has the vibration component of the image suppressed so that the image with corrected deflection can be output to the monitor.

The filter circuit 604 and the setting value of variable gain amplifier 606 are described to show a specific implementation method of the apparatus according to the present invention.

To consider the response of the feedback system, a model is contemplated in which the input is an image input u(t) and the output is a VTR, model output e(t).

Then, the transfer function of the system is represented in a discrete system such as, $$H(z)=E(z)/U(z)$$

However, E(z) is a z transformation of a sample value for e(t), and U(z) is a z transformation of a sample value for u(t).

As the TV camera 602 samples discrete image information in time series, the discrete system (digital system) is dealt with (the sampling frequency is considered to be within a range from 30 Hz to 60 Hz in the NTSC standards).

Here, it is desirable that the transfer function H(z) of this apparatus has a frequency characteristic of a notch filter. In order to implement this, the apparatus of the present invention comprises the filter 604 having the characteristics of a band-pass filter.

Here, representing the block diagram of FIG. 10 with the transfer functions by further modeling it, the transfer functions themselves are the same as previously shown in FIG. 4.

In the same figure, 201, 202, 203, 204 and 205 are transfer functions of the sampler, the movement detection circuit, the control unit, the D/A converter, and the actuator and variable apex angle prism, respectively.

Here, in this system, making the z transformations for Gho(s), A(s) and B(s) because it is a continuous system, and integrating the block 302, $$B'(z)/A'(z)=D(z)\cdot Z[Gho(s)\cdot B(s)/A(s)]$$

is obtained. This is a control subject (plant) of system.

Here, dividing a denominator R(z) of block 304 into two parts such as, $$R(z)=R_1(z)\cdot R_2(z)$$

the transfer function H(z) of the whole vibration-proof camera is $$H(z)=(R_1(z)R_2(z)A'(z))/(R_1(z)R_2(z)A'(z)+S(z)B'(z))$$

Then, if setting such as, $$1/R_1(z)=1/(1-2\gamma \cos(\omega_c T)z^{-1}+\gamma^2 z^{-2})$$

$1/R_1(z)$ has the characteristic of a band-pass filter. Note that $\gamma$ is a coefficient ($\gamma<1$), $\omega c$ is a central angular frequency, and T is a sampling interval.

Next, to make H(z) stable, the pole of the denominator of H(z) is allocated. Thereby, the system is stabilized, and the inverse characteristic of the BPF (i.e., notch filter) can be obtained under the influence of numerator $R_1(z)$.

At the same time an optimal loop gain is determined so that the value of variable gain amplifier 106 is determined.

Here, for the BPF, let the central frequency be $f_C$, the cut-off frequency on the high-pass side be $f_H$ and the cut-off frequency on the low-pass side be $f_L$.

And with that configuration, in accordance with the type of pick-up situation, the relation between the deflection frequency and the frequency characteristic of the BPF is set as follows.

*Holding pick-up mode (still)*

$f_C$=0.5–1.0 Hz $f_H$=2.0 Hz or more $f_L$=0.3 Hz or less

*Walking pick-up mode*

$f_C$=1.0–2.0 Hz $f_H$=3.0 Hz or more $f_L$=0.5 Hz or less

*Automobile pick-up mode*

$f_C$=2.0–5.0 Hz $f_H$=5.0 Hz or more $f_L$=1.0 Hz or less

That is, as the dominant frequency of camera deflection is different depending on the situation of the pick-up, the frequency of deflection correction control system can be set in accordance with each pick-up situation.

$f_H$, $f_C$ are to resolve the fifth problem of the present invention, and $f_L$ is to resolve the sixth to eighth problems.

Figure 11:
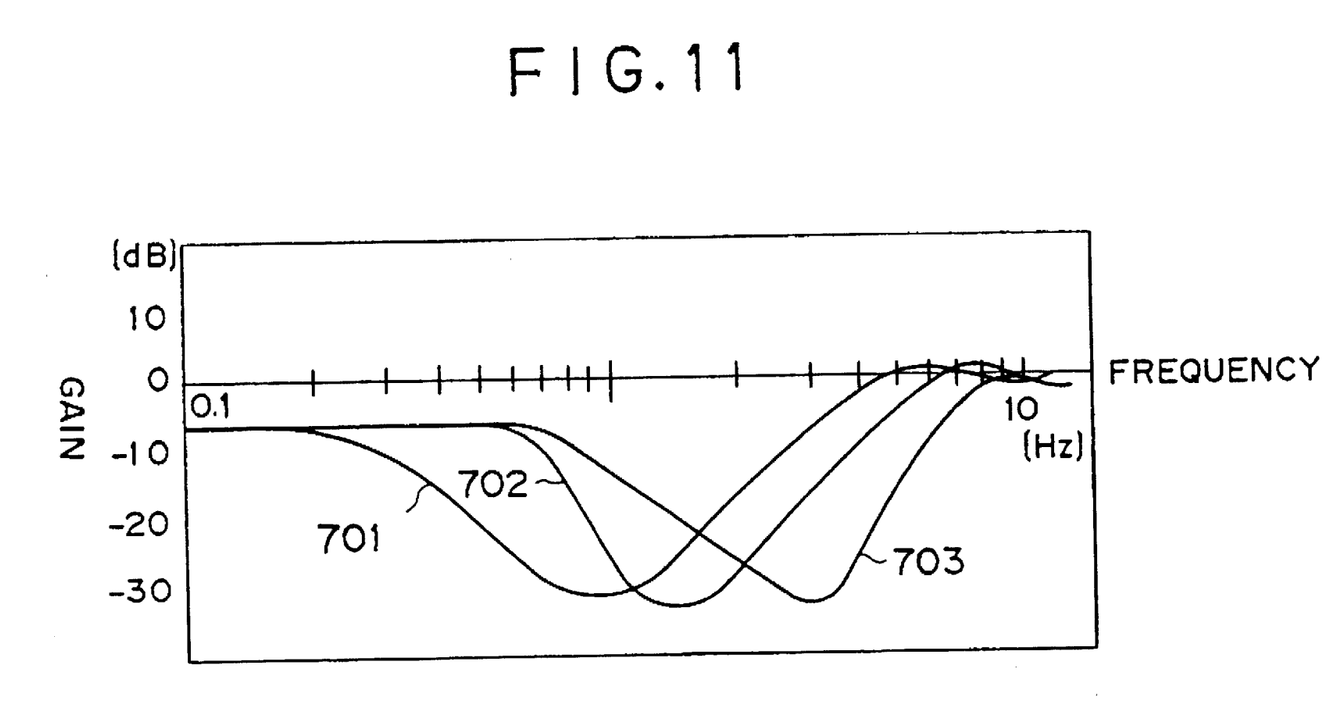
FIG. 11 is a view showing the frequency characteristics for a control system of the fourth example.

FIG. 11 shows the frequency characteristics of the apparatus of the the present invention for each of pick-up modes.

701, 702 and 703 show the frequency characteristic curves in the holding pick-up mode, the walking pick-up mode, and the automobile pick-up mode, for instance from a car, respectively.

As above shown, by switching the characteristic of filter 604 with a selected mode, the dominant disturbance frequency can be effectively suppressed so that a stable and natural image can be obtained with the vibration suppressed in the monitor output e(t).

Next, a further example of the present invention will be described.

Figure 12:
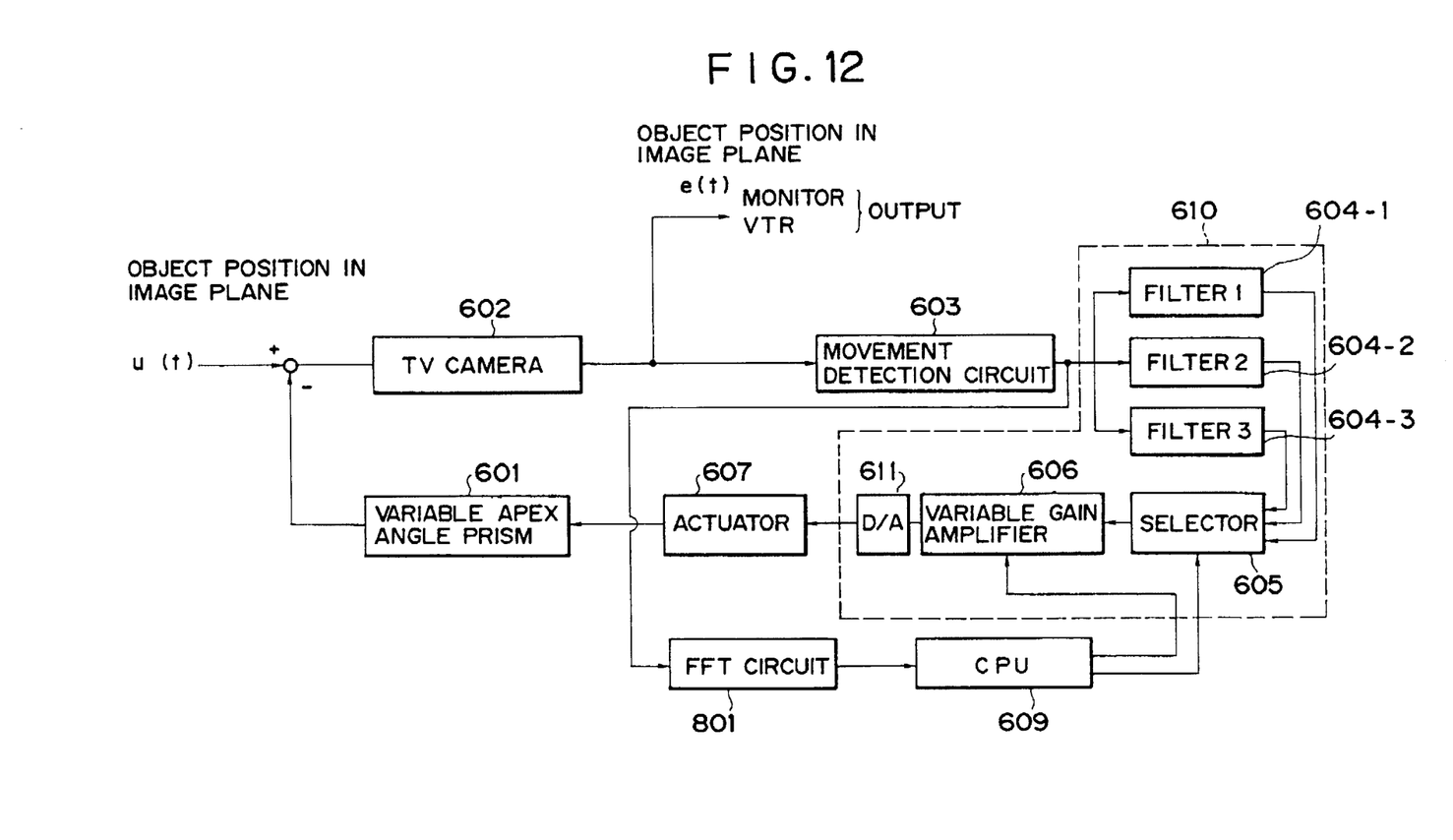
FIG. 12 is a block diagram showing a fifth example of a pick-up apparatus according to the present invention.

FIG. 12 is a block diagram showing a fifth example of a pick-up apparatus according to the present invention. This apparatus allows the automatic switching operation to be made in response to the mode selection switch 608 of the apparatus in the previous fourth example, with the other structure being the same.

Specifically, a FFT (Fast Fourier Transform) circuit is provided instead of the mode selection switch 608. The FFT circuit performs the frequency analysis, and can be substituted by the filter circuit, or implemented by the software in a program of the CPU 609.

Next, the operation of this apparatus will be described.

The output of the movement detection circuit 603 is a residual component which can not be attenuated by this vibration-proof pick-up apparatus. Thus, this residual component is detected by the FFT circuit 801 to detect its frequency distribution. And depending on that frequency component, the CPU 609 determines a proper mode in accordance with the deflection frequency, and selects a filter among filters 604-1 to 604-3.

That is, the FFT circuit 801 and the CPU 609 operate in such a way that the output of movement detection circuit 603 is the smallest.

In this way, according to the present invention, as the mode selection can be automatically made, a stable and natural image can be obtained without the need of special operations by the operator.

In the document entitled "Image deflection prevention technique of video camera" as indicated in the conventional example, the choice of the pick-up mode is also described, whereas this method in which the angular speed of the camera body is determined by a signal from the gyro sensor with only the feedback gain being variable differs fundamentally in constitution and effects from one as presented by the present invention in which the amount of movement is detected from an image to change both the feedback gain and frequency characteristic of filter, and the frequency component of the deflection itself is analyzed to switch the frequency characteristic and compensate for the deflection.

Figure 13:
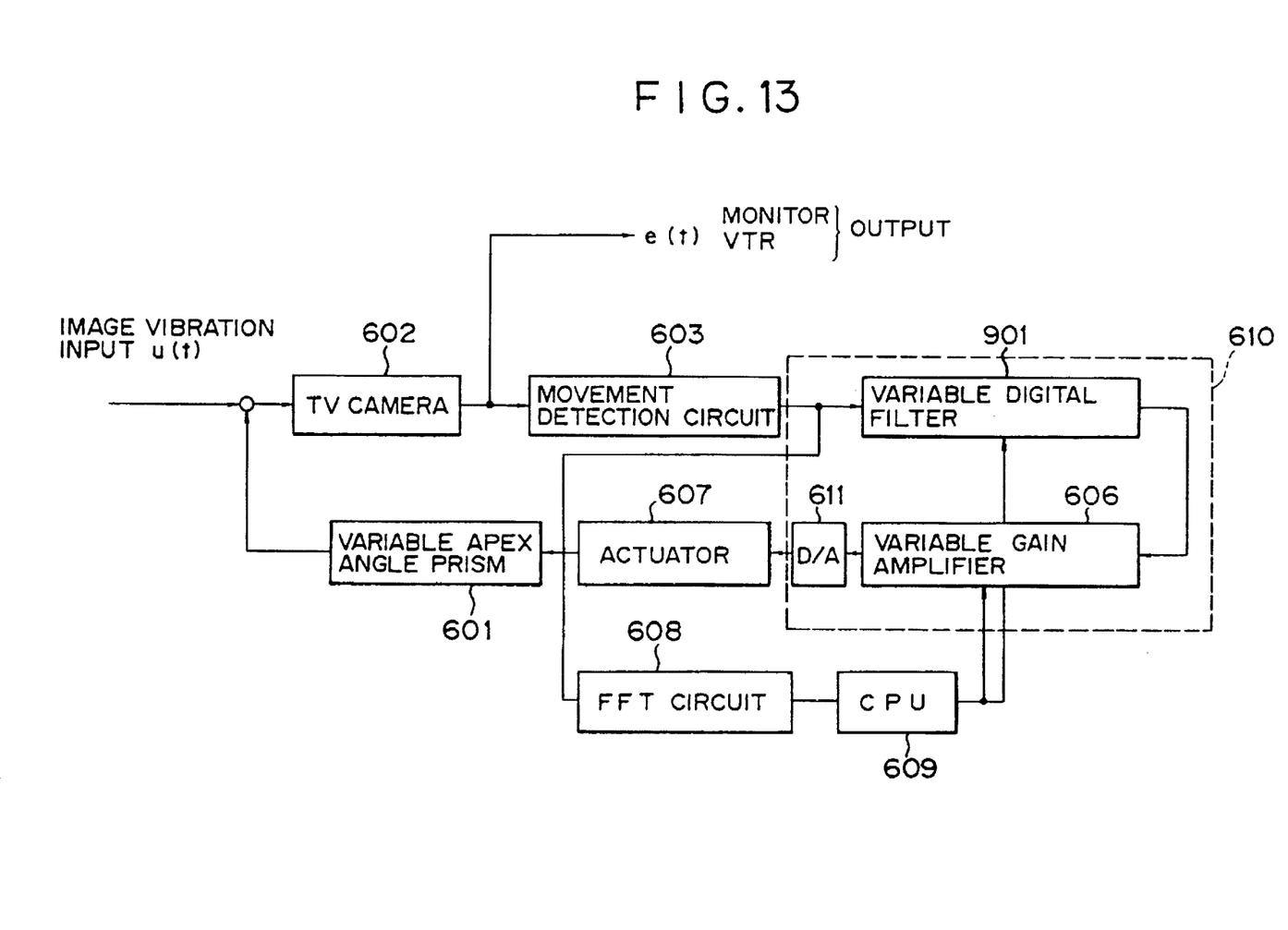
FIG. 13 is a block diagram showing a sixth example of a pick-up apparatus according to the present invention.

Next, a sixth example of a pick-up apparatus according to the present invention will be described with reference to FIG. 13.

This example shows an instance of using a filter whose characteristic can be changed continuously, rather than switching the filter selectively.

An alternative is to use a variable digital filter 901, rather than the filter 604 as shown in FIGS. 10 and 12.

The variable digital filter can be constituted by a so-called DSP (Digital Signal Processor) or by a CPU. When changing the frequency characteristic, operation parameters of digital filter are changed by software.

This apparatus can deal with various camera deflection frequencies, and further enhance the vibration-proof effect and provide a stabler image.

As above described, a pick-up apparatus according to the present invention is capable of providing a stable and non-deflecting image by being able to attenuate only the frequency with large amplitude of camera deflection in accordance with the situation of the image pick-up, because the closed loop frequency characteristic for the feedback loop in a vibration-proof control system for a vibration-proof TV camera or the like is provided by a notch filter, and the blocking frequency can be freely changed.

Also, it is possible to implement a natural and stable vibration-proof apparatus because the characteristics such as drift of the control system, consumption of power, or abrupt screen deflection at the critical correction angle can be improved.

What is claimed is:

1. An image sensing apparatus comprising:
    (A) detection means for detecting movement of an image;
    (B) correction means for correcting the movement of the image; and
    (C) control means having a filter having a predetermined filter characteristic, for controlling said correction means by generating a control signal in response to detection of movement by said detection means and according to said predetermined filter characteristic, said predetermined filter characteristic being predetermined according to (i) a relationship between frequencies filtered by said filter and (ii) a transfer function determined by a closed feedback loop formed by said detection means, said correction means, and said control means.

2. An image pick-up apparatus according to claim 1, wherein said control means has a band-pass filter in a control loop for controlling said correction means in accordance with the output of said detection means.

3. An image pick-up apparatus according to claim 2, wherein said correction means comprises shift means for shifting an image optically.

4. An image pick-up apparatus according to claim 1, wherein the blocking frequency of said filter is set to be approximately within a range from 0.2 Hz to 10 Hz.

5. An image pick-up apparatus according to claim 2, wherein the passing frequency of said band-pass filter is set to be approximately within a range from 0.2 Hz to 10 Hz.

6. An image pick-up apparatus according to claim 1, wherein said pick-up apparatus comprises a video camera.

7. An image pick-up apparatus according to claim 3, wherein said correction means comprises a variable apex angle prism.

8. An image pick-up apparatus comprising a closed loop control system including:
    (A) detection means for detecting movement of said image pick-up apparatus;
    (B) correction means for correcting the movement by shifting an image; and
    (C) control means having a filter, for controlling said correction means by generating a control signal in response to detection of movement by said detection means and based on the frequency characteristic set by said filter so that a correction amount of said correction means is automatically varied according to a dominant frequency component of the movement detected by said detection means and according to a relationship between the dominant frequency and a transfer function determined by a closed feedback loop formed by said detection means, said correction means, and said control means.

9. An image pick-up apparatus according to claim 8, wherein said control means controls said correction means in accordance with the output of said detection means to suppress the movement so that a suppression ratio is set to be a maximum for the movement due to trembling of hand.

10. An image pick-up apparatus comprising:
    (A) detection means for detecting movement of an image;
    (B) correction means for correcting the movement of the image; and
    (C) control means having filter means, for controlling said correction means by generating a control signal so as to vary a blocking frequency of said filter means by computing information of variations in a dominant frequency component of the movement detected by said detection means and transfer functions of a closed feedback loop formed by said detection means, said correction means, and said control means.

11. An image pick-up apparatus according to claim 10, wherein said filter means comprises of a plurality of filters having different blocking frequencies.

12. An image pick-up apparatus according to claim 11, further comprising a mode selector for switching said plurality of filters in accordance with a pick-up mode.

13. An image pick-up apparatus according to claim 11, further comprising switching means for automatically switching said plurality of filters in accordance with a pick-up mode.

14. An image pick-up apparatus according to claim 13, wherein said switching means selects a blocking frequency of said filter means by judging a pick-up situation from a frequency spectrum of an image.

15. An image pick-up apparatus according to claim 10, further comprising filter control means for adaptively switching the blocking frequency of said filter means in accordance with a pick-up situation.

16. An image pick-up apparatus according to claim 10, wherein the blocking frequency of said filter means is set to be a frequency of a camera deflection.

17. An image pick-up apparatus comprising:
    (A) detection means for detecting movement of a camera;
    (B) correction means for correcting the movement by shifting an image; and
    (C) control means having a band-pass filter, for controlling said correction means by generating a control signal so as to vary a pass frequency of said band-pass filter according to both (i) variations of a dominant frequency component of the movement detected by said detection means and (ii) transfer functions of a closed feedback loop formed by said detection means, said correction means, and said control means.

18. An image pick-up apparatus according to claim 17, further comprising filter control means for adaptively switching the blocking frequency of said band-pass filter in accordance with a pick-up situation.

19. An image pick-up apparatus according to claim 17, wherein the blocking frequency of said band-pass filter is set to be the frequency of a camera deflection.

* * * * *

UNITED STATES PATENT AND TRADEMARK OFFICE
CERTIFICATE OF CORRECTION

PATENT NO. : 5,666,158          Page 1 of 2
DATED : Sept. 9, 1997
INVENTOR(S) : SEKINE ET AL.

It is certified that error appears in the above-identified patent and that said Letters Patent is hereby corrected as shown below:

On the title page:

At [56] References Cited
FOREIGN PATENT DOCUMENTS

"2063376 3/1990 Japan" should read --2-63376 3/1990 Japan--.

At [56] References Cited
OTHER PUBLICATIONS
"Anti-Vibrartion" should read --Anti-Vibration--.

Column 2

Line 10, "on" should read --in--.

Column 3

Line 13, "excelelnt" should read --excellent--; and line 28, "vibraiton-proof" should read --vibration proof--.

Column 4

Line 30, "vibraiton". should read --vibration--.

Column 6

Line 42, "BPF104." should read --BPF 104.--.

UNITED STATES PATENT AND TRADEMARK OFFICE
CERTIFICATE OF CORRECTION

PATENT NO. : 5,666,158
DATED : Sept. 9, 1997
INVENTOR(S) : SEKINE ET AL.

It is certified that error appears in the above-identified patent and that said Letters Patent is hereby corrected as shown below:

Column 7

Line 1, "BPF104-1," should read --BPF 104.1,--.

Column 8

Line 32, "varriable" should read --variable--.

Column 10

Line 6, "pick-up" should read --the pick-up--.

Column 12

Line 10, "hand," should read --a hand.--.

Signed and Sealed this

Twenty-sixth Day of May, 1998

Attest:

BRUCE LEHMAN

Attesting Officer

Commissioner of Patents and Trademarks